United States Patent [19]

Hooks

[11] Patent Number: 4,632,192
[45] Date of Patent: Dec. 30, 1986

[54] MULTIPLE-UNIT APPARATUS FOR LIFTING SOD

[76] Inventor: Thomas E. Hooks, 300 NE. 3rd St., Belle Glade, Fla. 33430

[21] Appl. No.: 631,921

[22] Filed: Jul. 18, 1984

[51] Int. Cl.$^4$ ...................... A01B 45/04; A01B 35/20
[52] U.S. Cl. ...................... 172/19; 172/40; 172/125; 172/462
[58] Field of Search ...................... 172/19, 20, 21, 22, 172/40, 117, 462, 87, 89, 310, 311, 624, 125, 427, 483, 504, 661; 111/52 WT, 85

[56] References Cited

U.S. PATENT DOCUMENTS

| | | | |
|---|---|---|---|
| 1,634,144 | 6/1927 | Hargrave | 172/483 X |
| 2,947,372 | 8/1960 | Olson | 172/624 |
| 3,357,499 | 12/1967 | Finneyfrock | 172/19 |
| 3,590,927 | 7/1971 | Brouwer et al. | 172/19 |
| 3,747,686 | 7/1973 | Beck | 172/20 |
| 3,794,123 | 2/1974 | Whitesides | 172/624 |
| 3,807,504 | 4/1974 | Nunes | 172/19 X |
| 3,812,918 | 5/1974 | Beck | 172/19 |
| 4,077,478 | 3/1978 | Neukom | 111/85 X |
| 4,294,316 | 10/1981 | Hedley et al. | 172/20 |
| 4,335,790 | 6/1982 | van der Lely | 172/125 X |
| 4,351,396 | 9/1982 | Moulton | 172/41 X |
| 4,354,556 | 10/1982 | Evans | 172/19 |
| 4,363,362 | 12/1982 | Barato | 172/117 X |

Primary Examiner—Richard T. Stouffer
Assistant Examiner—Terrence L. B. Brown
Attorney, Agent, or Firm—Wolf, Greenfield & Sacks

[57] ABSTRACT

A sod cutting unit supports a vibrating sod-cutting blade on a pivot under a platform and driving and control mechanism above the platform, while drawing the platform across a field on a support which allows the platform to pivot around a horizontal axis parallel to the direction of motion across the field. A multi-unit machine supports two or more units from the same draft suspension, an intermediate unit of three being additionally movable up-and-down relative to the outer units. Each unit pivots independent of all the others.

6 Claims, 19 Drawing Figures

MULTIPLE-UNIT APPARATUS FOR LIFTING SOD

FIELD OF THE INVENTION

This invention relates to apparatus for lifting sod with a vibrating sod undercutting blade, and is directed in particular to improved apparatus for cutting sod quickly and uniformly on a commercial scale. It has among its objects to provide an improved sod-cutter unit which resists the usual causes of breakdown that are common to prior sod cutters, including but not limited to clogging by the sod being cut, and to provide an improved apparatus for mounting and driving a plurality of such units in unison so as to cut a plurality of parallel strips of sod to a substantially uniform depth.

THE PRIOR ART

It is common in the prior art of sod cutters having a vibrating sod undercutting blade to pivot the blade arms at their top ends and to drive each blade arm from a cam mechanism located near the ground surface, via links (sometimes called a "dog-bone") connected to the arm pivotally near the cutter-blades. U.S. Pat. Nos. 3,509,944 (Brouwer et al) and U.S. Pat. No. 3,812,918 (Beck) show typical examples. This practices is vulnerable to flying debris, such as stones and sod particles, which can cause early breakdown and fast wear due to friction. The use of chain drives exposed to these condition, as shown in Beck, adds noise without overcoming the problems of early breakdown and accelerated wear-out. Additional examples of the same practice are shown in Gerrits - U.S. Pat. No. 4,029,152 and Ditter - U.S. Pat. No. 2,905,253.

The Beck patent shows a ganged sod harvesting apparatus which uses a single rigid drive mechanism to drive three sod cutter units through a common shaft (66) and gear-drive unit (26). The center unit is the draft suspension, while the outboard units are fixed to it via links (e.g; 68,70 for unit 14) which allow the outboard units to move up and down with relation to the center unit. A chain (e.g; 88) is fitted between an outboard unit and the center unit, to provide additional support when the entire harvester is lifted; in practice this chain has been found to introduce a tilting of the outboard unit in one direction arounds its link axis (72) when the harvester is drawn over rough ground, resulting in non-uniform sod-harvesting. The upper-end mounting of the blade arm (e.g.: 48 at 52) is stated by Beck to introduce a tendency to move the outboard unit (e.g.: 14) back and forth-horizontally-with respect to the center unit, and to restrain this motion a stabilizer arm (e.g.: 80) is provided. The mechanical drive to the outboard units is via universal joints (e.g.; 62). The center unit (12) engages the conventional 3-point hitch of a tractor, and the shaft (66) is attached to the power take-off of the tractor.

GENERAL NATURE OF THE INVENTION

Each sod-cutter unit of the invention has a vibratable sod undercutting blade mounted to and supported from a parts-supporting platform which during operation of the sod-cutter unit is disposed in a generally horizontal plane. The blade has a pair of arms extending vertically, the blade being connected between the lower ends of the arms, and the upper ends of the arms extending above the platform. Between their upper and lower ends, the arms are connected to a pivot below the platform. The upper ends of the arms are coupled to an eccentric drive mechanism that is mounted on the upper side of the platform above the horizontal plane. A motor for the drive mechanism is also mounted on the upper side of the platform; preferably, an oil motor is used. Each unit has a ground surface gauge roller supported beneath its platform and adjustable from above the platform.

Multiple sod-cutter units are supported side-by-side from a common draft suspension which during operation of the sod-cutters is in a generally vertical plane. In an exemplary arrangement of three sod-cutter units that will be described, the two outermost units are each connected to the draft suspension on a support which extends normally (i.e.: horizontally) from the draft suspension and allows each unit platform limited freedom to rotate around an axis extending substantially parallel to the plane of the platform in a direction perpendicular to the unit sod-cutter blade and substantially equidistant between the blade-supporting arms. A subsidiary draft suspension is supported on the common draft suspension, between the two outermost sod-cutter units, with freedom to move vertically (up and down) relative to the common draft suspension while being held in a plane parallel to that of the common draft suspension. A parallel arm arrangment is preferably used, and it holds the subsidiary draft suspension a distance away from the common draft suspension. The subsidiary draft suspension has a support for a third sod-cutter unit, which support also extends normally from the draft suspension and allows the third sod-cutter unit limited freedom to rotate around an axis extending substantially parallel to the plane of the unit platform in a direction perpendicular to the unit sod-cutter blade and substantially equidistant between the blade-supporting arms.

Thus, when the common draft suspension is placed in position to put the three sod-cutter units on the ground surface, the two outermost sod-cutter units can rotate around their respective horizontal axes while the intermediate unit can do likewise and at the same time move up or down relative to the two outermost units. Each sod-cutter unit has its own independently-adjustable ground surface gauge, supported with its adjusting mechanism on its own platform. Each sod-cutter blade unit has its own drive motor for vibrating its sod-cutter blade; preferably oil motors are used, driven from a common pump. The common draft suspension can be attached to the conventional 3-point hitch of a tractor, and power for the common pump can be taken from the tractor's power take-off.

DETAILED DESCRIPTION OF THE DRAWINGS

Figure 1:
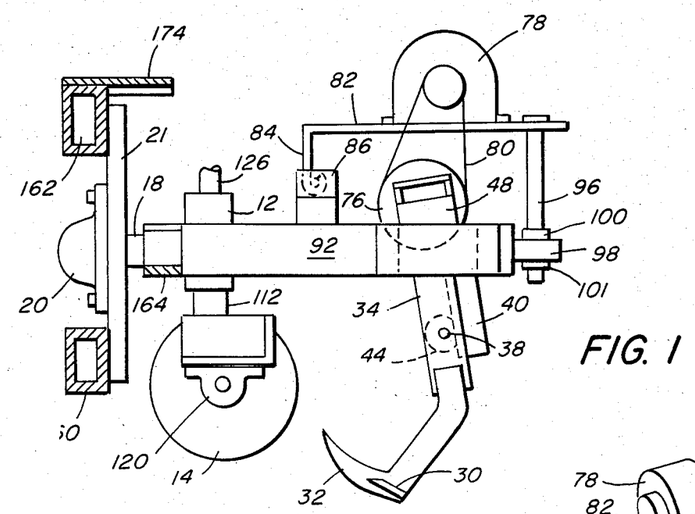
FIG. 1 is a side-view, partially schematic, of a sod-cutter unit.
Figure 1A:
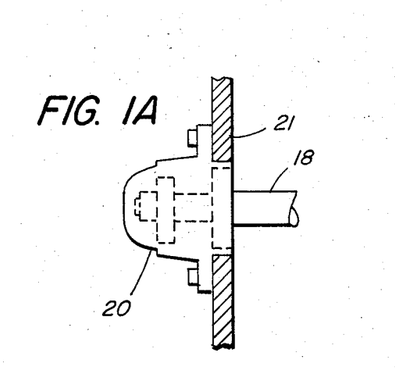
FIG. 1A shows a detail of FIG. 1.
Figure 2:
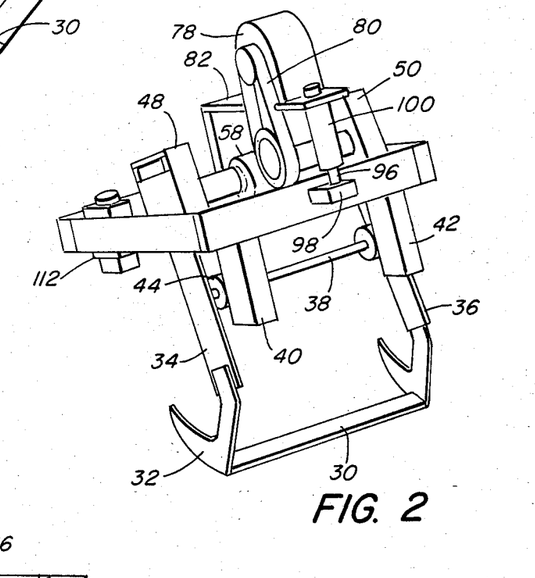
FIG. 2 is a rear-quarter view of FIG. 1.
Figure 3:
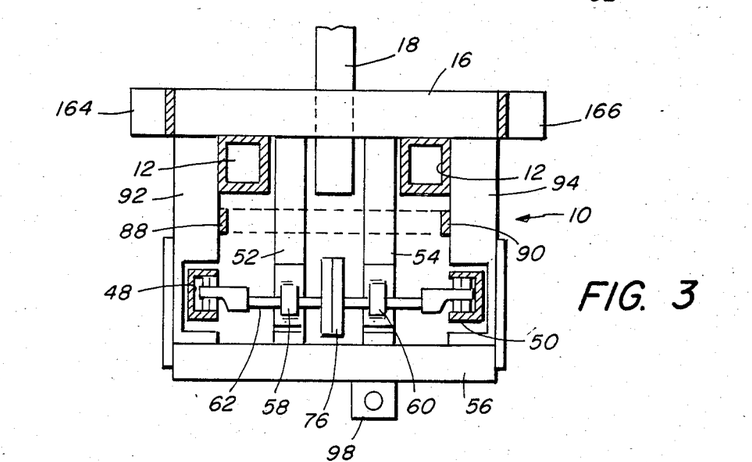
FIG. 3 is a top-view, partly cut-away and partly-schematic, of the sod-cutter unit shown in FIG. 1.
Figure 6:
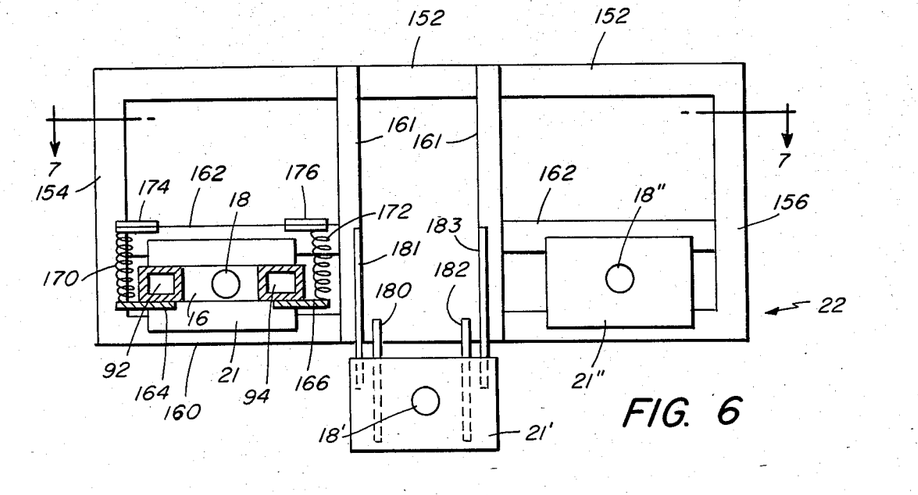
FIG. 6 is a rear plan view of a common draft suspension intended to mount and carry three sod-cutter units according to FIG. 1.

FIGS. 1–5 inclusive illustrate a sod-cutter apparatus unit according to the invention. The working parts of the unit are all mounted on and supported from a platform 10, which is a rigid rectangular frame lying in a plane which is generally horizontal during operation of the unit to cut sod. This platform is preferably made of pieces of square cross-section steel tubing welded together. FIG. 3 shows typical square cross-section tubing pieces 12, 12, which are used to support a ground-surface gauge roller 14 shown in greater detail in FIG. 5. The front cross-member 16 of the platform 10 is fixed on a shaft 18 which passes through the cross-member 16 and is welded fast to it. At its forward end the shaft 18 is fixed rotationally in a bearing support 20 of known design (e.g.: a heavy-duty trailer-wheel hub which, similarly to a mount for an automobile wheel, incorporates two tapered bearings (e.g.: TIMKEN), and a retainer nut and cotterpin on the inner end of the shaft 18, which parts being well-known are schematically illustrated in FIG. 1A which in turn is mounted to and supported from a sub-member 21 of a draft suspension 22 that is shown in FIG. 6. The draft suspension 22, which will be described in greater detail with reference to FIGS. 6 and 7, inclusive, is in a generally vertical position during operation of the sod-cutter or cutters that it carries. A sod undercutting blade 30 with side-cutters 32 is fitted between the lower ends of two arms 34, 36, which are pivotally connected intermediate their ends to an axle 38 fixed beneath the platform 10 on downwardly extending supports 40, 42. Preferably, the axle 38 is rotatable in bearings (not shown) in pillow blocks 44, 46, that are fixed on the supports 40, 42, respectively, and the arms 34, 36, are welded to respective ends of the axle.

Figure 4:
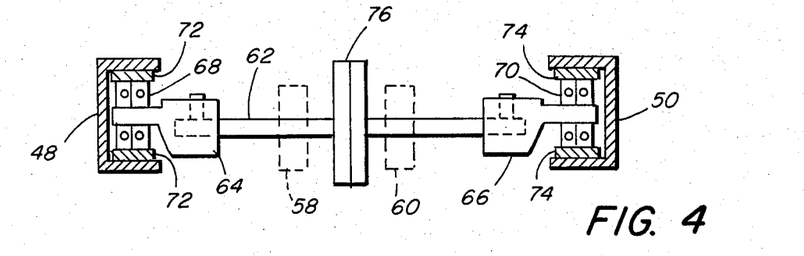
FIG. 4 is an enlarged detail view of the eccentric drive mechanism for the sod under-cutting blade in the unit of FIG. 1.

At their upper ends, above the platform 10, the arms 34, 36, are fitted with three-sided boxes 48, 50 respectively having their open sides confronting each other. A pair of rigid bars 52, 54, mounted between the front cross-member 16 and the rear cross-member 56 of the frame 10 support respective first and second pillow blocks 58, 60, between the open sides of the boxes 48, 50. A drive shaft 62 is journaled in ball bearings (not shown) in the pillow blocks. Each end of this drive shaft is fitted with an axially off-set eccentric drive element 64, 66, respectively, fitted with a ball-bearing output coupling 68, 70, respectively, which fits snugly within one of the respective boxes 48, 50, respectively, through the open side of the box. Desirably each box is fitted with hardened antifriction pads 72, 74, respectively, to engage the drive surfaces of the eccentric output couplings 68, 70. These details are best shown in FIG. 4. A pulley 76 is fitted to the drive shaft 62, for coupling the shaft to a drive motor 78 via a belt or belts 80.

The drive motor 78 is mounted on a generally L-shaped motor support 82 above the plane of the unit platform 10. The motor support 82 is pivotally-connected at its forward downwardly angled end 84 (see FIG. 1) to a cross-member 86 mounted at its ends 88, 90, to respective side members 92, 94, of the platform 10, and extending across the platform above its plane. The horizontal part of the motor support, to which the motor is fixed, ends rearwardly of the rear cross member 56 of the platform, where it is fixed to the upper end of a downwardly-extending threaded tension adjuster 96. The lower end of the tension adjuster engages an apertured pad 98 welded to and extending rearwardly from the rear cross member 56. An internally-threaded nut 100, which may take any desired form, is used to adjust the distance between the motor support 82 and the rear cross-member 56 of the platform, to set a desired tension in the belt 80, and, in reverse, to facilitate changing belts. A lock nut 101 may be used beneath the pad 98, if desired.

As can be seen, all the parts and the motor for vibrating the sod undercutting blade 30 are supported on the platform 10, above its plane, well away from flying dirt and stones, and easily accessible for service. The "dog-bone" drive characteristic of most prior art machines is not used. The eccentric drive on the rigid platform 10, via a rigid shaft 62 and rugged eccentric drive components driven by its own independent motor eliminates the tendency to move a sod-cutter unit back and forth horizontally as is described by Beck, when multiple sod-cutter units are driven on a common draft suspension. Even the axle 38 around which the sod undercutter blade 30 vibrates can be located higher above the ground surface than the "dog-bone" connector of Beck and other prior-art machines, and the only moving parts, in the pillow blocks 44, 46, can be sealed from dust and dirt. As a result, operating experiences obtained in test uses comparing sod cutter apparatus according to the invention with apparatus according to Beck, for example, have demonstrated that the invention is capable of a significant increase in operating time without breakdown, compared with apparatus of the prior art.

Figure 5:
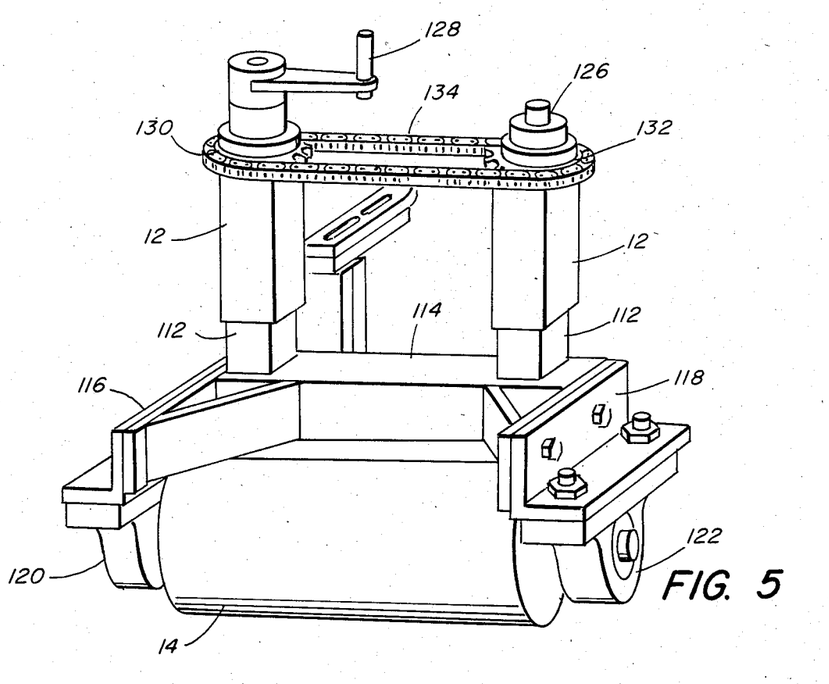
FIG. 5 is an enlarged detail view of the ground-surface gauge roller in the unit of FIG. 1.
Figure 5A:
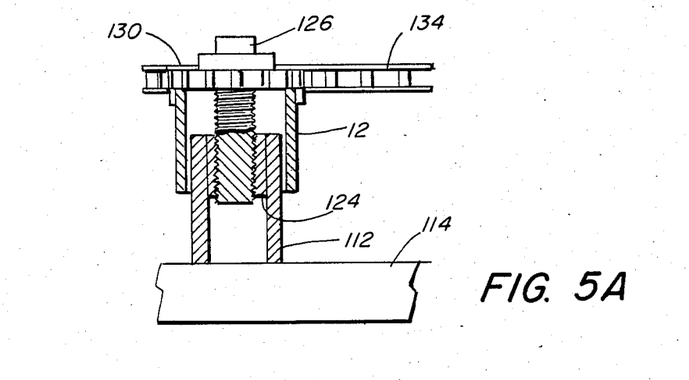
FIG. 5A shows a detail of FIG. 5.

The ground-gauge roller 14 is supported from the two square support tubes 12, 12, which are welded within the inside forward corners of the platform 10, as in shown in figure 3. A smaller square tube 112 which fits telescopically inside each support tube 12 (see FIGS. 5 and 5A), is fixed at its lower end to one end of a frame 114 for the roller 14. The frame 114 includes rigid truss-like fore-and-aft end members 116, 118 to the respective under-sides of which pillow blocks 120, 122, are attached, and the roller 14 is journaled at its ends in these pillow blocks. The smaller square tubes 112 are fitted in their upper ends with internally threaded nuts 124 one of which is shown in figure 5A. A threaded shaft or rod 126 is engaged in each nut. One such rod or shaft extends into an operating crank 128. A toothed drive pulley 130, 132, is fixed to each threaded shaft 126. A drive-chain 134 links both pulleys, so that turning the first or master pulley 130 a fixed number of angular degrees with the crank 128 will turn the second or slave pulley the same number of degrees. This simple mechanism, which also is above the plane of the platform 10, adjusts the ground-gauge roller 14 evenly and precisely, and thereby makes it possible to cut sod uniformly to a desired thickness.

Figure 7:
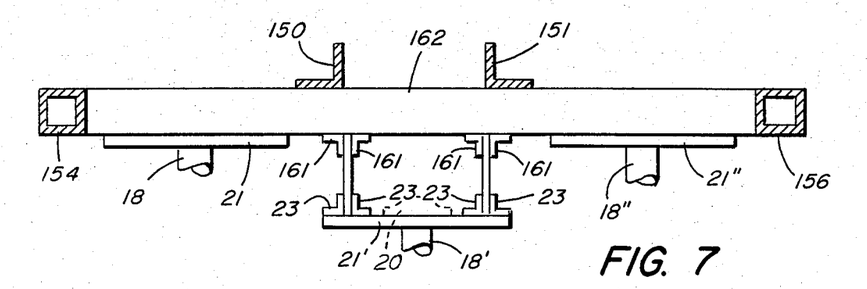
FIG. 7 is a schematic view taken on line 7—7 of FIG. 6.
Figure 10:
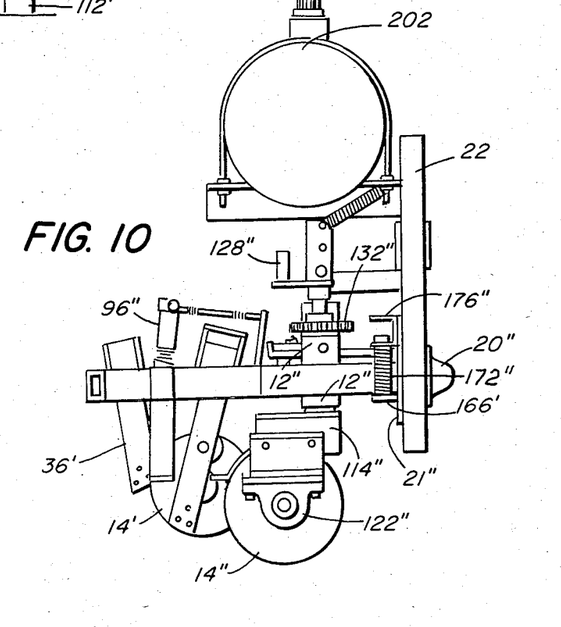
FIG. 10 is a right-hand end view of the draft suspension showing a right-end unit and in part an intermediate unit, and a reservoir tank for hydraulic oil fitted to it.

Referring to FIGS. 6 and 7, the draft suspension 22 is made of straight rectangular cross-section hollow steel tubes 160, 152, 154 and 156 welded together at their ends to form respective bottom, top, left-side and right-side members of a flat rectangular frame 158. An additional cross-member 162 spans this frame between the side members, parallel to the bottom member 160, being welded to the inner surfaces of the side members at its ends. Near the left-side 154, the sub-member 21, which mounts the sod-cutter apparatus described above with relation to FIGS. 1-5, is fixed to the bottom and cross-members 160, 162, as by welding. The bearing support 20 for the shaft 18 protrudes into space between the bottom and cross-members, as is shown in FIG. 1. A similar sub-member 21" carrying a bearing support 20" and shaft 18" for pivotally mounting another sod-cutter apparatus unit near the right-side 156 is fixed to the bottom and cross-members 160, 162 near the right-side. A right-side sod-cutter apparatus unit is shown in FIG. 10, in which parts corresponding to parts in the left-side sod-cutter apparatus unit have the same reference characters double-primed.

Referring to FIGS. 3 and 6, the front cross-member 16 of the platform 10 is fitted at its ends with shoulder pads 164, 166 extending beyond the opposite sides 92, 94 of the platform. Corresponding shoulder pads 174, 176 are fixed to the upper cross-member 162 of the draft suspension. Compressed coil springs 170, 172 are fixed, respectively, between the pads 164 and 174 on one side of the platform 10, and between the pads 166 and 176 on the other side of the platform. This arrangement limits rotation of the platform 10 around the axis of the shaft 18 while providing resilient response to forces on the sod-cutter apparatus unit which urge it to rotate around that axis. A similar mounting and rotation control arrangement is provided for the right-side sod-cutter apparatus unit; except for a compression spring 172" between pads 166" and 176", these details are not shown in FIG. 10.

Another sod-cutter apparatus unit is carried by the draft suspension intermediate the left-end and right-end units, on a modified sub-member 21' which allows motion up and down relative to the draft suspension 22 in addition to a controlled rotational motion similar to that provided for each of the end units. Referring to FIGS. 6-9, inclusive, parts of the intermediate unit which are common to the end units bear the same reference characters as like parts of the left-end unit, single-primed. The sub-member 21' of the intermediate unit is mounted to the draft suspension 22 on two pairs of parallel links 180, 181 and 182, 183. Each link is pivotally connected at its ends to the draft suspension 22 and to the sub-member 21' via angle brackets. At the draft suspension, angle brackets 161, in pairs, span the bottom and cross members 160, 162 (see FIGS. 7, 8), and may if desired extend to the top member 152 of the draft suspension (shown in FIG. 6). Angle brackets 23 are fixed in pairs to the confronting side of the sub-member 21' near the side edges. A pressure pad 190 (FIG. 9) is fitted to the top edge of the sub-member 21', and a roller 192 carried at the end of an arm 194 is arranged to provide downward force on the sub-member 21'. The arm 194 is pivotally connected intermediate its ends to one end of a link 196, the other end of which is connected to one pair of the angle brackets 161 of the draft suspension. A spring 198 applies resilient force urging the other end of the arm 194, opposite the roller 192, away from the draft suspension, as is indicated by the double-headed arrow 199. This arrangement allows the intermediate unit carried by the intermediate sub-member 21' to move up-and-down relative to the draft suspension 22 while resiliently urging the unit downward, and at the same time the intermediate unit is permitted independently to rotate around the axis of its mounting shaft 18' in the same resiliently limited fashion as the end units carried on sub-members 21 and 21". However, referring to FIGS. 8 and 8A, in this instance the compression springs 170' and 172' are held in a horizontal position between vertically-oriented pads 164' and 166' on the front cross member 16' of the intermediate unit platform 10' and a common pad 175 fixed between them on the intermediate submember 21'.

Figures 11, 12:
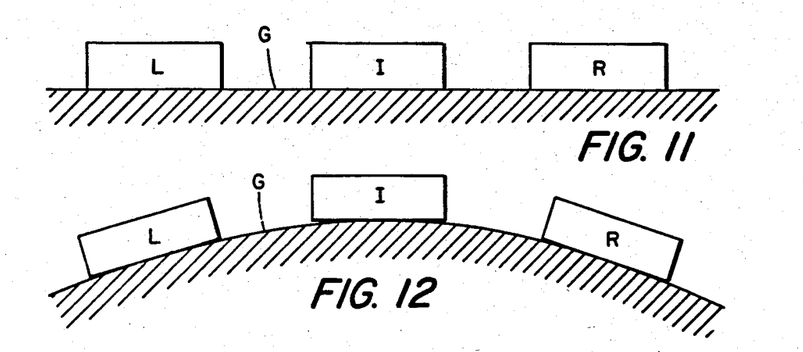
FIG. 11 schematically illustrates the relative positions of three sod-cutter units of the invention mounted to the draft suspension of the invention being drawn over flat ground.
FIG. 12 schematically shows the relative positions of the same three units being drawn over a crown-surfaced (convex) piece of ground.
Figure 13:
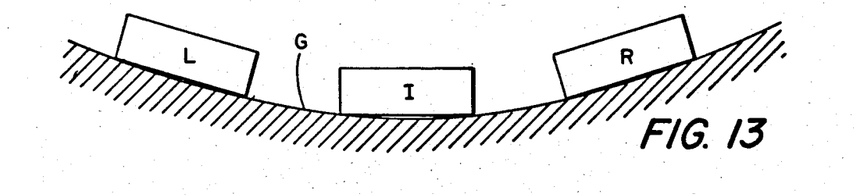
FIG. 13 schematically shows the same three units being drawn over a piece of ground that is concave in the direction transverse to the direction in which the units are being drawn.
Figure 14:
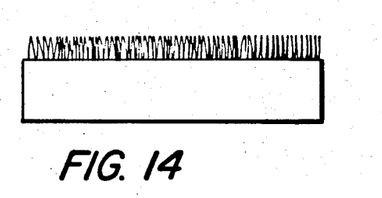
FIG. 14 illustrates a piece of turf as cut uniformly by the present invention in any of the situations shown in FIGS. 11, 12 and 13.
Figure 15:
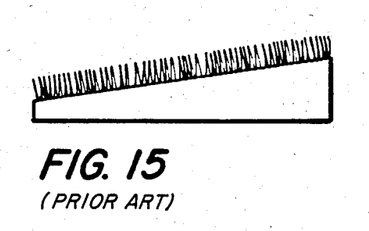
FIG. 15 shows a piece of turf cut unevenly by a prior art multi-unit sod-cutter machine.

The unique benefits of the invention can now be appreciated. Referring to FIGS. 11-13, three-units of a multiple-unit sod-cutter machine are represented by three rectangles labelled "L", "I" and "R", for left-side unit, intermediate unit, and right-side unit, respectively, corresponding to the sod-cutter apparatus units pivotally mounted on the sub-members 21, 21' and 22", respectively. The ground contour, in a direction across the path of the machine is labelled "G". In FIG. 11, the ground is flat, and the sod-cutter units can individually easily correspond to it. In FIG. 12, the machine is passing over a crowned (convex) surface, forcing the intermediate unit to move upward relative to the left end and right end units, a motion that is permitted by the parallelogram link suspension 181-183 and the compression spring 199. At the same time, each of the outer (left-side and right-side) units can rotate around the axis of its shaft (18, 18") independent of each other and of the intermediate unit, with the result that each sod-cutter apparatus unit follows the contour of the ground immediately beneath it, as FIG. 12 shows. Similarly, when the multiple-unit machine passes over a dip in the ground surface, concave as shown in figure 13, the intermediate unit drops to the ground surface, and each unit rotates around the axis of its supporting shaft (18, 18', 18") as is needed for that unit to follow the contour of the ground immediately beneath it. In each unit, the ground-contact gauge roller 14, 14' or 14" establishes both the posture of the unit on the ground within the constraints individually imposed on it, and the depth of cut. There is no connection, chain, link or otherwise, between adjacent units which can force an individual sod-cutter apparatus unit to assume an undesired posture relative to the ground surface immediately beneath it. The result is that both single and multiple-unit sod-cutter machines according to the invention can cut sod uniformly, as is shown in FIG. 14, whereas prior art multiple unit machines unavoidably cut some sod unevenly as shown in FIG. 15.

Figures 8, 8A:
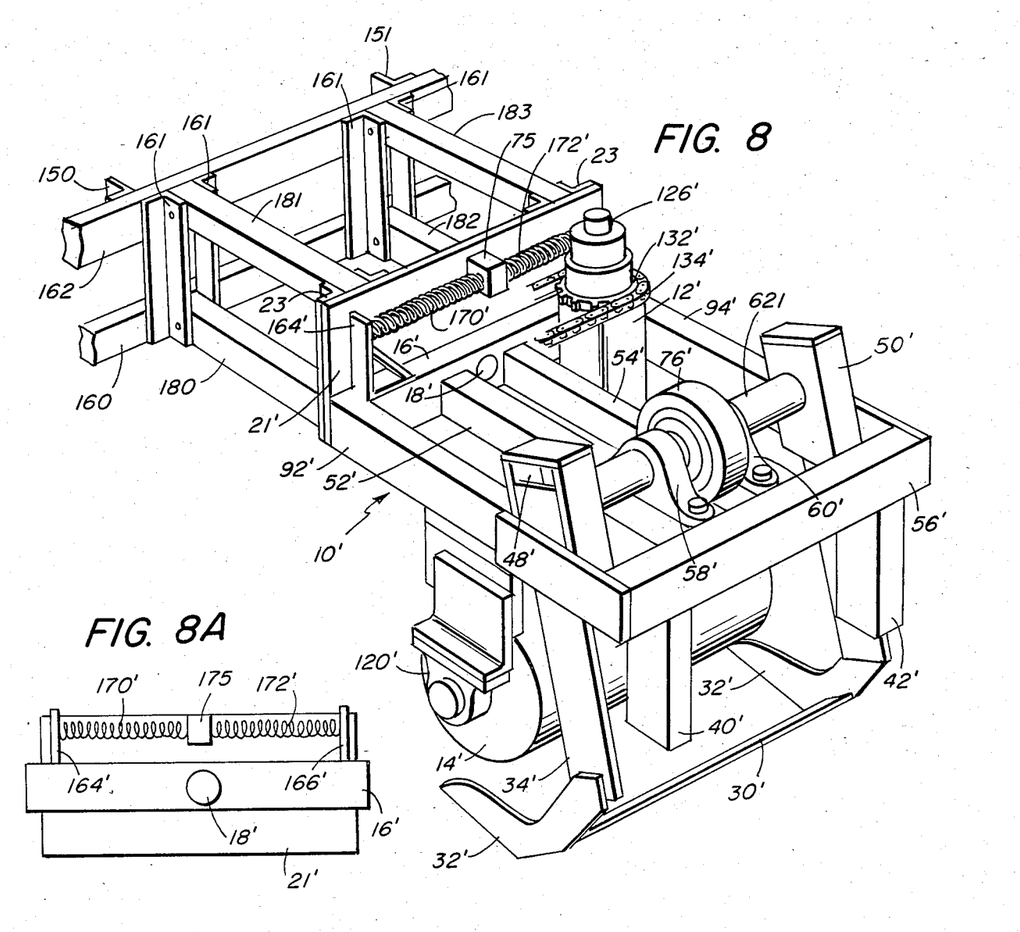
FIG. 8 shows the attachment of an intermediate sod-cutter unit to the draft suspension.
FIG. 8A shows a detail of FIG. 8.
Figure 9:
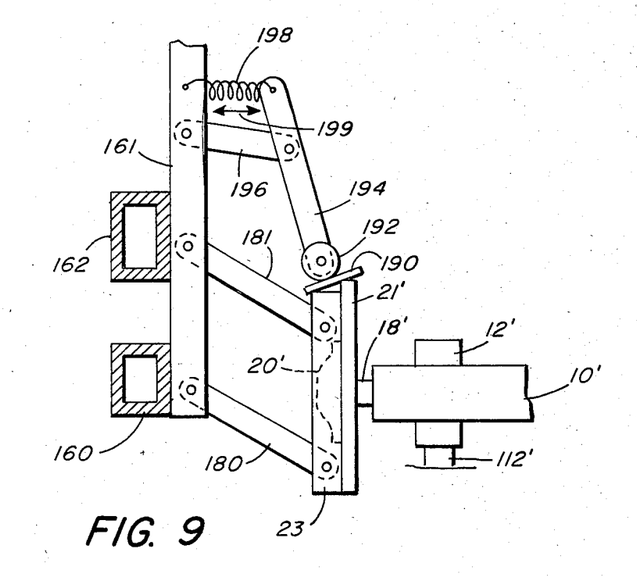
FIG. 9 is a side view of FIG. 8.

FIGS. 7 and 8 show the location of two angle-brackets 150, 151 on the front side of the draft suspension 22 which are useful for attaching the machine to two points of a usual 3-point tractor hitch. The third point may be attached near the top of the draft suspension 22, to the top member 152 shown in FIG. 6. Also shown in FIG. 10 is an oil reservoir tank 202 for the oil used to drive motors 78, 78' and 78''(shown in FIG. 16), mounted on a bracket 200 fixed to rear side of the draft suspension. The weight of oil in the tank 202 bears down directly on the sod-cutter units when the machine is operated.

Figure 16:
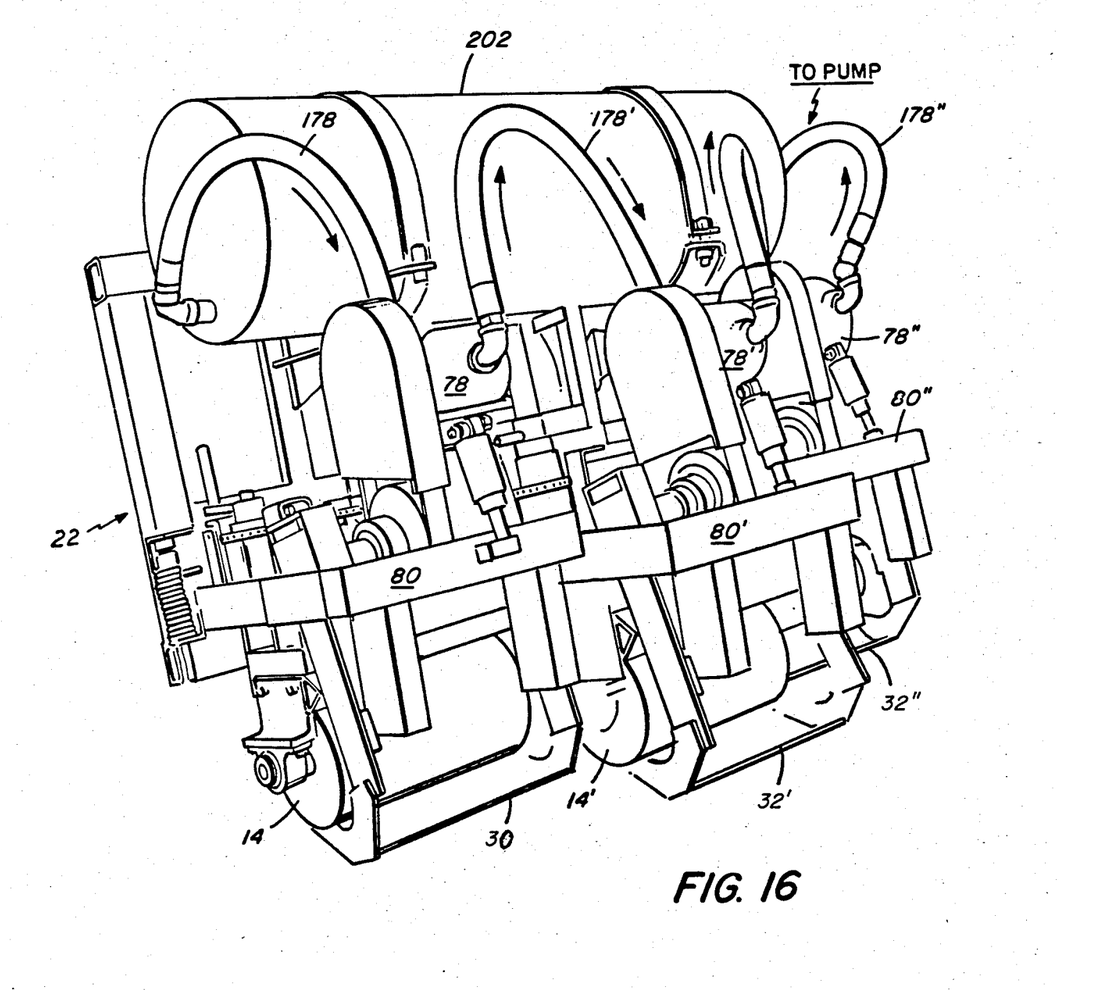
FIG. 16 is a rear view of a three-unit machine according to FIGS. 6–10, inclusive.

FIG. 16 shows the three oil motors 78, 78' and 78'' connected together in series by hoses 178, 178' and 178'', respectively. An oil pump (not shown) is included in the hydraulic circuit, in a known fashion, and is connected, in a known fashion, to the power take-off of the tractor to which the machine is connected, so as to drive all three motors in unison. An oil-motor drive system is preferred for its reliability and quiet running. It will be understood, however, that the invention is not limited to the use of oil motors.

I claim:

1. A multi-unit sod-lifting apparatus including a primary draft suspension supporting a plurality of individual sod-lifting apparatus units while drawing all of them in a sod-cutting path, said apparatus comprising first and second support means supporting first and second of said units from respective first and second locations which are spaced apart on said primary draft suspension, means supporting a third of said units from a third location on said primary draft suspension which is intermediate said first and second locations, said third unit support means including a subsidiary draft suspension coupled to said primary draft suspension via a parallelogram link which during use holds said subsidiary draft suspension spaced from said primary draft suspension with freedom to move up-and-down relative to said primary draft suspension and to said first and second units, and means effective during use for urging said subsidiary draft suspension downward relative to said primary draft suspension and to said first and second units, said latter means including a pressure pad fixed to said subsidiary draft suspension, an arm fitted at one end with a roller and connected intermediate its ends via a link to said primary draft suspension, and resilient means between said primary draft suspension and the remaining end of said arm for urging said roller downwardly against said pressure pad.

2. In an apparatus according to claim 1, each of the sod-lifting apparatus units comprising: means providing a two-dimensional substantially planar parts-supporting platform intended during operation of the apparatus to be disposed substantially within a horizontal plane, means fixed to and depending from said platform providing a pivot fixed rigidly below said plane for a vibratable sod under-cutting blade, a sod under-cutting blade having a pair of substantially vertically disposed upward-extending blade-support arms pivotally connected intermediate their respective upper and lower ends to said pivot means for supporting said blade from said pivot means beneath said platform, said blade extending substantially horizontally between said lower ends beneath said platform, said arms extending upward to dispose said respective upper ends above said plane, motor means supported on said platform above said plane, a drive shaft supported in bearings fixed on said platform above said plane, said drive shaft having at each end an axially off-set terminal portion extending to one of said upper arm ends, said terminal portions being off-set by the same amount and in the same direction relative to the longitudinal axis of said shaft, an oscillating cam in the form of a bearing having an inner race and an outer race fixed to each off-set terminal portion of said shaft, means including a pair of confronting pads fixed at each of said upper arm ends spaced to provide a gap receiving the outer race of one of said bearings between each of said pairs, and thereby coupling said shaft at each axially off-set terminal portion to one of said upper arm ends, so as to drive said upper ends back-and-forth together around said pivot means when said shaft is rotated by said motor means.

3. A sod-lifting apparatus unit according to claim 1 including a pair of individually length-wise adjustable support means depending from said platform for supporting at its ends a ground surface gauge roller beneath said platform, and means on said platform above said plane for simultaneously adjusting the length of both of said support means so as to adjust said gauge roller vertically relative to said platform.

4. A sod-lifting apparatus according to claim 2 wherein each of the motor means comprises an oil motor supported on the unit platform above said horizontal plane thereof, means on said draft suspension for holding a supply of hydraulic oil, whereby said supply contribute is adapted to the weight of said apparatus and means carried entirely on said apparatus for connecting said oil motors and said supply for driving said motors in unison.

5. An apparatus unit according to claim 2 including mount means affixed to a peripheral part of said platform for holding said platform in said horizontal plane, said mount means including a first part rigidly affixed to said platform and a second part rotationally connected to said first part on an axis of rotation extending across said platform within said plane substantially equidistant between said arms in a direction perpendicular to said blade, and means to affix said second part to said draft suspension.

6. Sod-lifting apparatus unit according to claim 5 including resilient means connected between said platform and said draft suspension for controlling rotational displacement of said platform around said axis substantially equally in each direction.

* * * * *